United States Patent [19]

Berthel

[11] Patent Number: 4,884,440
[45] Date of Patent: Dec. 5, 1989

[54] PROCESS FOR THE ELIMINATION OF NOISE FROM DATA

[75] Inventor: Robert O. Berthel, Windham, N.H.

[73] Assignee: The United States of America as represented by the Secretary of the Air Force, Washington, D.C.

[21] Appl. No.: 173,920

[22] Filed: Mar. 25, 1988

[51] Int. Cl.$^4$ ............................................. G01W 1/14
[52] U.S. Cl. ................................. 73/170 R; 73/171; 364/420; 364/518; 364/555; 364/567; 364/571.03; 364/574; 364/577; 364/723; 364/724.1; 342/195
[58] Field of Search ...................... 364/413.17, 413.18, 364/513, 513.5, 518, 555, 567, 571.02, 571.03, 574, 577, 723, 724.1, 420, 200 MS File, 900 MS File; 73/170 R, 171; 342/26, 195

[56] References Cited

U.S. PATENT DOCUMENTS

| | | | |
|---|---|---|---|
| 4,070,900 | 1/1978 | Engels | 364/571.03 X |
| 4,080,657 | 3/1978 | Caldicott et al. | 364/571.03 X |
| 4,193,039 | 3/1980 | Massa et al. | 364/571.02 X |
| 4,231,097 | 10/1980 | Shibayama et al. | 364/577 |
| 4,301,510 | 11/1981 | Ricciardi et al. | 364/567 |
| 4,476,718 | 10/1984 | Plank et al. | 73/171 |
| 4,499,761 | 2/1985 | Plank et al. | 73/170 R |
| 4,514,758 | 4/1985 | Berthel et al. | 358/23 |
| 4,525,794 | 6/1985 | Scheffer et al. | 364/567 |
| 4,529,050 | 7/1985 | Mosher et al. | 364/567 X |
| 4,545,445 | 10/1985 | Naito | 364/571.03 X |
| 4,561,018 | 12/1985 | Berthel et al. | 358/107 |
| 4,587,620 | 5/1986 | Niimi et al. | 364/574 |

OTHER PUBLICATIONS

AFGL-TR-87-0118 "A Computer Decision-Making Process for the Elimination of Noise from Data", 27 Mar. 1987 by R. Berthel.
AFGL-TR-83-0063 "Snow Characterization Instruments" dtd 1 Mar. 1983 by L. Gibbons et al.
AFGL-TR-83-0174 "AFGL Snow Characterization Measurements" by R. Berthel et al. dtd 21 Jul. 1983.

Primary Examiner—Thomas H. Tarcza
Assistant Examiner—Bernarr Earl Gregory
Attorney, Agent, or Firm—William G. Auton; Donald J. Singer

[57] ABSTRACT

A process for eliminating noise from an actual data stream, and plotting the actual data stream with a superimposed set of interpolated data values is disclosed. The set of interpolated data values represent an estimate of the actual data stream which is relatively uncontaminated by noise as a result of the process of the invention. This process begins with collecting the actual data stream by taking measurements which are subject to noise. These measurements are input into a microprocessor which is programmed to identify quiescent periods in the actual data stream which are relatively uncontaminated by noise, and which interpolates the data values by a weighting factor derived during the quiescent periods when the actual data stream is relatively uncontaminated by noise. The process concludes by a computer-generated plot of the actual data stream along with a superimposed set of interpolated data values.

1 Claim, 6 Drawing Sheets

PROCESS FOR THE ELIMINATION OF NOISE FROM DATA

BACKGROUND OF THE INVENTION

The present invention relates generally to data analysis techniques, and more specifically to a process for reducing the contamination of data by extraneous readings superimposed on data values by noise sources.

Data analysis is often complicated by the problem of determining true values of measurements from those contaminated by extraneous signals normally referred to as "noise." The most common method of alleviating this problem is to average the raw data over some period of time so that the resulting mean values approximate the true readings. This approach is effective in some cases, especially when the noisy signals are symmetrically superimposed upon a data base in both magnitude and polarity. Data averaging may also be effectively employed on random noise if the data are averaged over log time periods. Extraneous random readings do not exhibit a preference in their deviations from a data base and will, over a suitably long time period, tend to cancel one another to give accurate mean values.

There are, however, circumstances where averaging may not produce acceptable results, such as in situations of severe noise that that are biased in magnitude and polarity. In fact, numerical averaging can only successfully repress noise (to the point that smoothed data will closely approximte uncontaminated base data) if the extraneous readings of the noise have symmetry in polarity and symmetry in magnitude. Such instances are rare. Whenever noise exhibits either asymmetry in polarity, asymmetry in magnitude, or asymmetry in both polarity and magnitude, then conventional numerical averaging will exhibit a similar asymmetry in attempting to approximate uncontaminated data.

In view of the foregoing discussion, it is apparent that there currently exists the need for a data-analysis process that reduces the contamination of data by noise. The present invention is intended to satisfy that need.

SUMMARY OF THE INVENTION

The present invention is a process which reduces the effects of noise on data in a data stream. This process, broadly expressed, is a procedure which consists of three steps: identifying quiescent periods in a given data stream; calculating a weight $W_Q$ for each of these quiescent periods; and interpolating the data by assigning an interpolated weight value to individual data points which represents an estimate of the actual data which is relatively uncontaminated by noise. Each of these steps is explained in more detail below.

As mentioned above, the process of the present invention begins with an identification of all quiescent periods in the data stream. Note that the data stream can be any set of collected data, such as the target echo returns accumulated by a radar system. A quiescent period in the data stream contains at least three sequential data points in the data base, which have minimal amplitude variations between each of the data points. This step is, in turn, divided into substeps. The first substep entails averaging the weights (or signal amplitudes) at increments of three data points to produce an average weight. Next, the average weight is compared with each of the individual data points such that if the weight of any data point varies from the average more than a specific weight limit, then the sequence is rejected as a possible quiescent period, and the computer steps ahead and repeats the process.

When all three sequential data points are within the weight limit of their average, than a quiescent period (QP) is designated, and the computer steps ahead and repeats the process to identify other quiescent periods in the data stream. If no quiescent periods are identified in the data stream, then the weight limit can be increased, and the data stream reevaluated until quiescent periods are found.

The philosopy behind the use of quiescent periods to calculate a weighting factor for interpolating data is as follows. Quiescent periods in a data stream represent points of time where the gathered data is relatively uncontaminated by noise. Therefore, quiescent periods provide a better indication of what the true, uncontaminated data stream actually is like, when compared to other more noisy intervals. The weight limit mentioned above should represent a value which equals the expected change in the data stream between successive data points. An actual example of the present invention will be presented in a detailed discussion of the invention.

The second major step in the process of the present invention entails the calcualtion of a weight for each of these quiescent periods. This is done by averaging the weight over the increments of three or more data points in the quiescent period.

Upon the identification of all quiescent periods in the data stream, and upon determining the weight of a valid quiescent period ($W_Q$) and some data point number $N_Q$, the final step in the process is to construct a straight line approximation of the data points between adjacent quiescent periods in the data stream. This final step is divided, in turn, into two substeps. The first substep entails the calculation of an incremental weight difference by a subtracting the weight of adjacent quiescent periods from each other, and normalizing them over those data points. Next, all individual intervening points are assigned an interpolated weight value, which is product of their point number multiplied by the incremental weight difference. The result is a plot which represents an estimate of the actual data stream when uncontaminated by noise.

The process described above is a data analysis technique that mimicks the logic of human reasoning when a person plots a hand-drawn, best-guess curve on a chart of noisy data samples. This process can be used by a data processing system to eliminate extraneous readings and reduce the effects of noise on any collection of data in a manner that is impossible by conventional averaging analytical schemes.

It is an object of the present invention to present a process which reduces the effects of random noise on a data system.

It is another object of the present invention to provide an approximation of collected data within acceptable error boundaries which represents the data without the effects of extraneous noise.

It is another object of the present invention to provide a process which will compensate for the effects of severe noise that is based in both magnitude and in polarity.

These objects together with other objects, features and advantages of the invention will become more readily apparent from the following detailed descrip-

DETAILED DESCRIPTION OF THE PREFERRED EMBODIMENT

The present invention is a process for reducing the contamination of extraneous noise on base-line data values. Traditional data gathering systems, such as radar systems, rely on a combination of electronic filtering and data analysis techniques to distinguish the true value of desired data from extraneous noise. Automated data-analysis routines normally resort to some form of numerical averaging to suppress noise with the assumption that the smoothed values will closely approximate the base data. There are, however, circumstances where averaging may not produce acceptable results such as in situations of severe noise that are biased in magnitude and polarity. This is demonstrated in the discussion regarding FIGS. 1-4, as presented below. Note that if the extraneous signals are biased in magnitude and/or polarity, averaging may, in turn, produce biased results no matter how many points are included in the averaging interval. Short-term averaging, on the other hand, can be used confidently only in cases where the superfluous readings are symmetrical in nature.

The four plots of FIGS. 1-4 illustrate the problems associated with averaging data that have extraneous signals superimposed on base-line data. In each case, the base data consists of 200 constant readings as indicated by the horizontal dashed lines. Also, in each case, the mean value of the total 200 points (long-term averaging) agrees with the base readings. The smoothed lines are the results of a 20 point, running-mean average (short-term).

Figure 1:
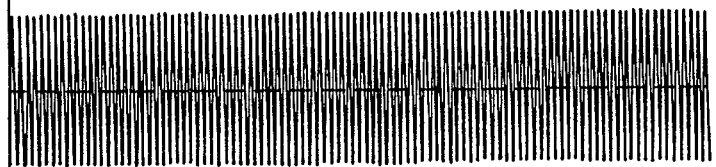
FIG. 1 is a chart which depicts averaging used on data with noise which has symmetry in both magnitude and polarity.

The reader's attention is now directed towards FIG. 1, which is a plot which illustrates the use of conventional averaging to form a numerical approximation to suppress noise which is superimposed on base-line data. In FIG. 1, the true data is a horizontal line which is surrounded by extraneous noise (represented by the saw-toothed tracing) that is symmetrical in both polarity and magnitude. Symmetry in magnitude means that all of the noise plots have the same amplitude. Symmetry in polarity means that there are equal amounts of pulses in the up direction as there are in the down direction with respect to the horizontal base-line data.

The noise in FIG. 1 represents the *only* example in which straight-line averaging will produce the base-line data by cancelling out the noise. Symmetry in both magnitude and in polarity is extremely rare in a noise phenomenon. The subsequent FIG. 2-4 are intended to illustrate the shortcomings of averaging when noise has asymmetry in magnitude, polarity, or both magnitude and polarity with respect to the base-line data.

Figure 2:
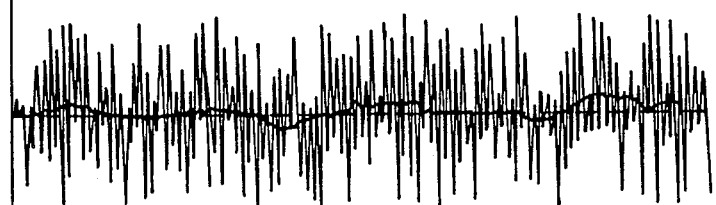
FIG. 2 is a chart which depicts averaging to estimate constant data which has noise with random magnitude and symmetrical polarity.

In FIG. 2 the true data is represented by a horizontal line, as in FIG. 1. However, the extraneous noise which is imposed on the data has symmetry in the polarity of the noise (alternately + and − the base data) with the magnitude of the deviation selected randomly. The 20 point averaged line shows departures from the base-line readings.

Figure 3:
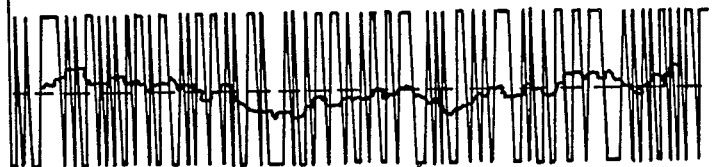
FIG. 3 is a chart which depicts averaging to estimate constant data which has noise with symmetrical magnitude and random polarity.

FIG. 3 is a chart in which the extraneous noise has symmetry in magnitude, and random polarity superimposed on constant base-line data. The short-term average line in FIG. 3 shows a larger deviation than that of FIG. 2, and suggests that the effects of signal noise polarity can have a greater effect than asymmetry in signal magnitude alone.

Figure 4:
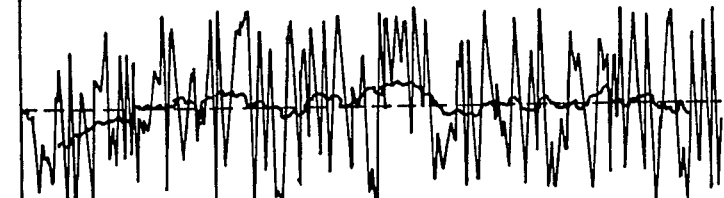
FIG. 4 is a chart which depicts averaging to estimate constant data which has noise with random magnitude and random polarity.

In the chart of FIG. 4, there is extraneous noise which has both random magnitude and random polarity superimposed upon a horizontal line which represents constant base-line data. A 20 point running-mean average is indicated by the smoothed line, which is the estimate of the horizontal dashed line of the true data. FIGS. 1-4 indicate that short-term averaging of noisy data is only able to produce an estimate that corresponds to the actual data when the noise has symmetry in both magnitude and polarity. As mentioned above, such instances are rare.

The present invention is a process for elimation of noise from data which is an improvement over the conventional averaging method used in data analysis. The principle behind the invention is the observation that when interpolating data, it is better to assign a weight to the data that is taken from a quiescent period, when the data is relatively uncontaminated by noise. When an estimate of data is obtained by averaging noisy data, with noise spikes which have random magnitude and polarity, the estimate is biased by the noise, and will not represent the true data, which is masked by the noise. To thoroughly explain the present invention, an example of its use is presented in the discussion which follows.

One embodiment of the present invention has been experimentally used with an instrument to determine the rate of falling snow. The operation of this prototype device is based on accurate and sensitive weight measurements from an electronic balance that are converted into mass and associated with time in the subsequent calculation of snow rate. The acquisition of naturally-falling snowflakes requires the use of an open collection container that, in conjunction with the high-resolution weighing device, makes the instrument responsive to the effects of wind action. Because of the ever-changing nature in the periodicity of wind gusts and the variability of wind velocities, the raw-weight data display periodic fluctuations of varying magnitude. Several automatic reduction schemes were tried in the analysis of these data, but none could be found that would produce results within acceptable error limits. The problem was finally resolved with the development of a technique that instructed a computer to conduct an analysis using a format akin to human reasoning. Because the computer makes decisions based on particular characteristics of the data set and adjusts parameters to produce optimum results, the analytical routine may be considered as a form of artificial intelligence. Therefore, this invention may have beneficial applications in other analytical and reduction procedures.

Figure 5:
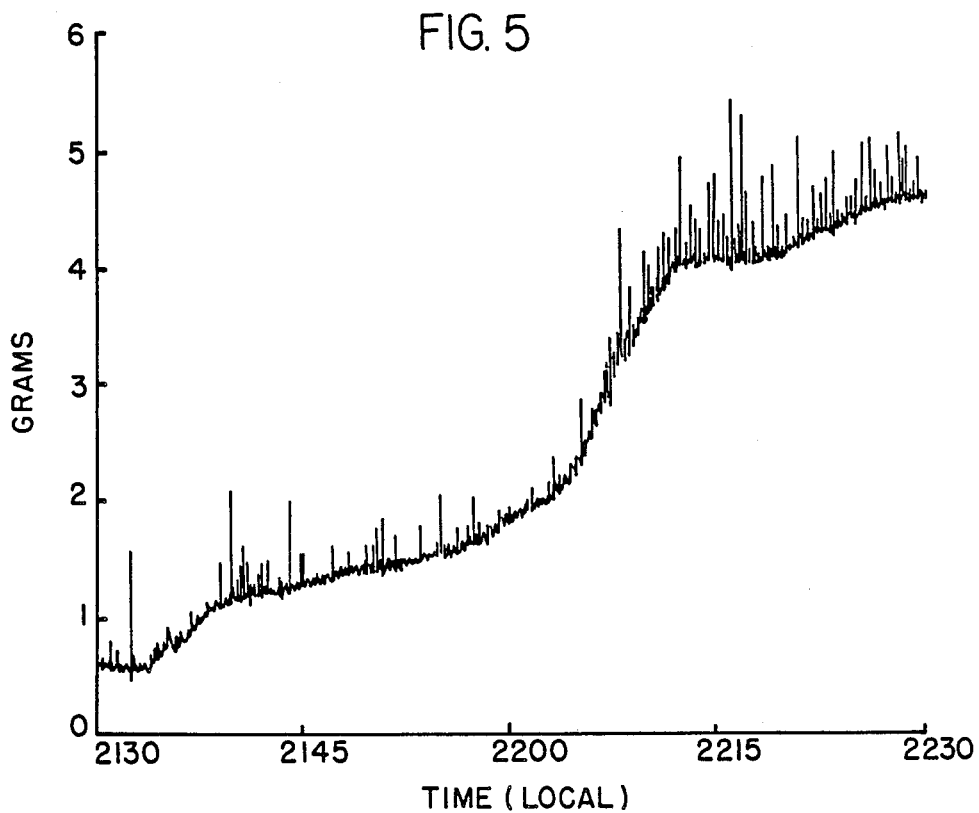
FIG. 5 is a chart of actual snow weights recorded by a system similar to that in FIG. 14.

FIG. 5 shows one hour of snow weights as recorded on 10 Dec. 1982 during a field experiment at Camp Grayling, Mich. This plot consists of 1200 weight readings, one every 3 sec, as measured by an electronic balance having a 0.01 g sensitivity. The nature of these measurements, where the balance is weighing the accumulation of naturally-falling snowflakes, dictates that the weight readings will remain constant in the absence of snowfall and will increase during periods that snow is falling. The only allowable deviation from these rules, assuming a stable instrument environment and no zero drift, is a decrease in weight because of sublimation or the evaporation of snow from the collection container that is evidenced by gradually declining weight readings over long periods of time. Sudden increases or decreases in weights that subsequently return to the base line (data spikes) are illogical in this type measurement and are classified as being extraneous or data noise. The base curve from the weights of accumulated snowfall in FIG. 5 is readily distinguishable as are the major positive and the minor negative spikes that are superimposed on the curve. These extraneous readings are the effects of wind action on the open collection container. The differences in the magnitude of the spikes above and below the data base line are attributed to a shielding mechanism that serves to dampen the negative readings. The problem, obviously, is one of determining the actual data from the combination of weight and noise readings.

Figure 6:
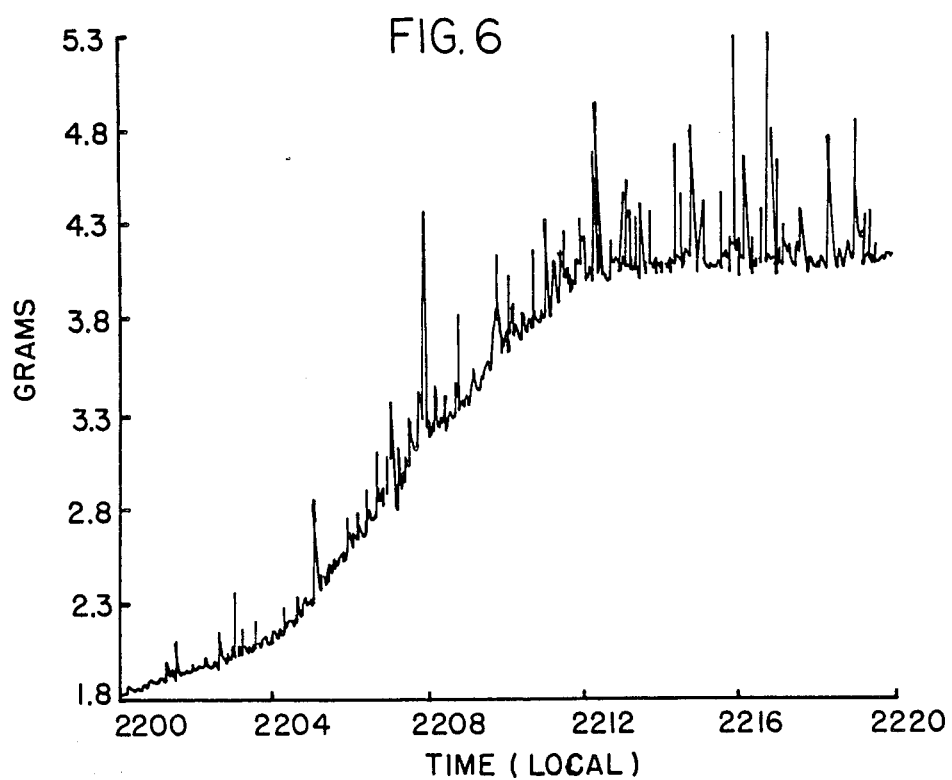
FIG. 6 is a 20-minute segment of the noisy data of FIG. 5.

The individual raw-data readings are more definable in the 20 min (2200 to 2220) plot in FIG. 6. This time segment was chosen as it illustrates slightly increasing weights with little or no noise (initial period), increasing noise and weights (central period) and high noise with little or no increase in weight (latter period). The small fluctuations during the initial quiet period constitute the normal variations of these data. By identifying similar quiet periods between wind gusts and drawing a connecting line through them, a "best guess" weight curve may be determined as indicated by the smoothed, hand-drawn line in FIG. 7. This is a perfectly acceptable method of eliminating the superfluous readings caused by the wind effects, but it is labor intensive, time consuming, and, above all, it is not processed in an automated reproducible manner.

Figure 8:
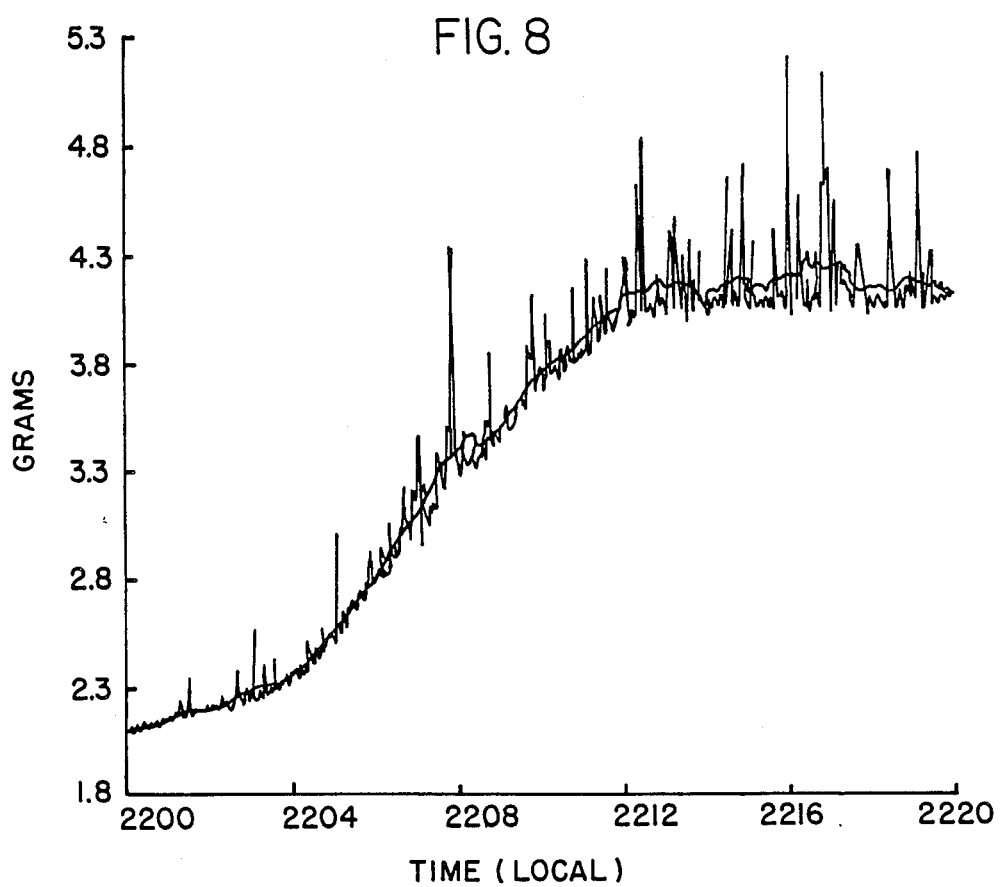
FIG. 8 is a 20-minute segment of the noisy data of FIG. 5 with a 1-minute running mean average superimposed on it.
Figure 9:
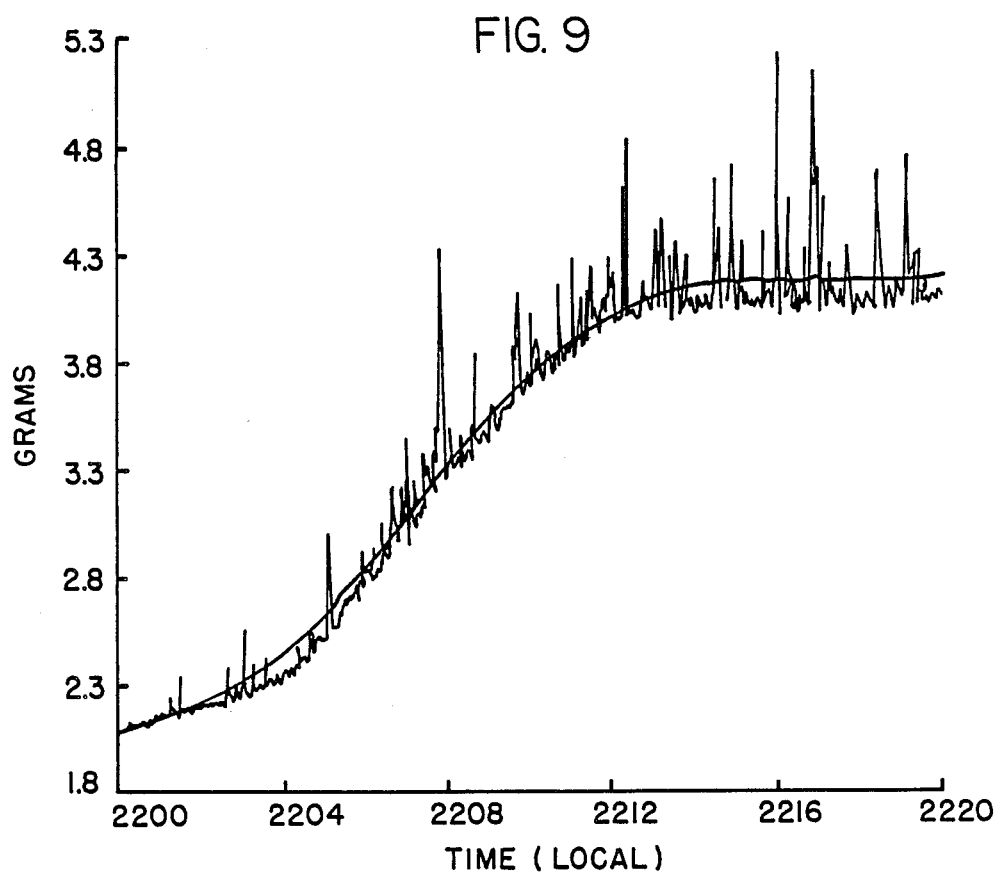
FIG. 9 is a 20-minute segment of the noisy data of FIG. 5 with a 5-minute running mean average superimposed on it.

Data smoothing by computer processing is generally accomplished by some form of data averaging. It is apparent from the discussion presented above that the averaging of these highly biased, snow-weight data will not produce adequate results. FIG. 8 shows the weight readings from FIG. 6 with a superimposed 1 min, running-mean line. The averaged data points agree favorably during the initial 3 min of little or no wind action, but show considerable deviation for the remainder of the time period. Lengthening the averaging period will result in further smoothing as evidenced by the 5-min, running-mean averaged line in FIG. 9, but the values will never match the true weights during periods exhibiting strong nosiy signals. Long averaging periods also tend to blunt or mask small changes in the base data.

Figure 7:
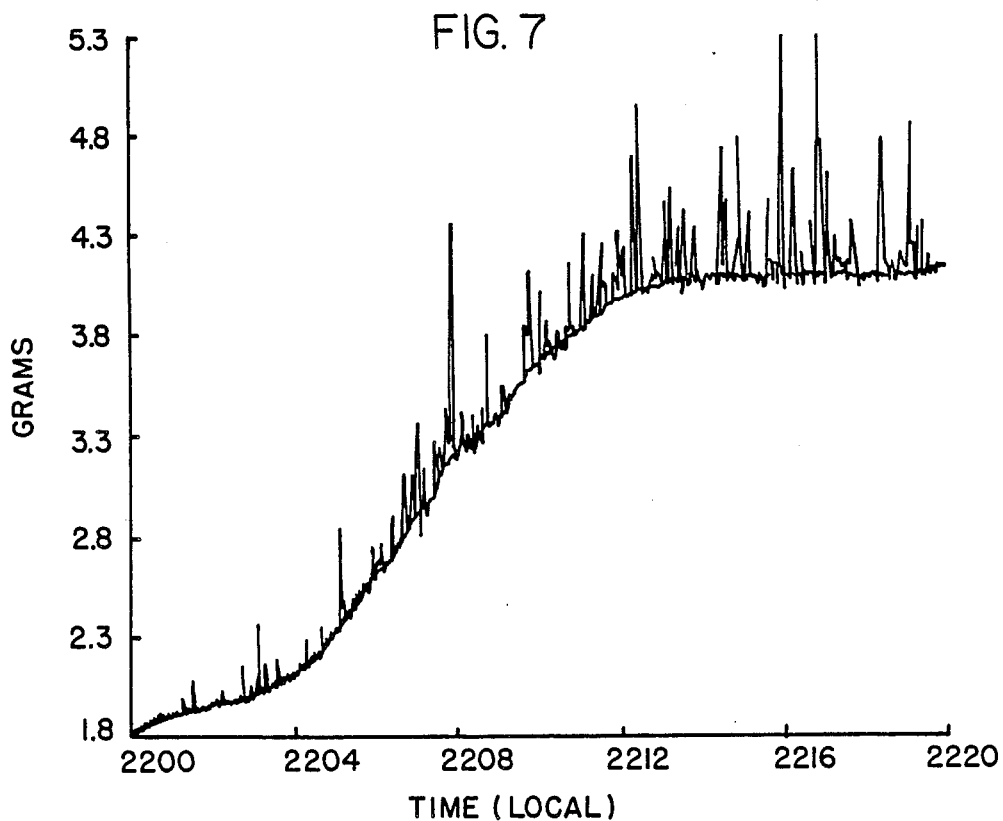
FIG. 7 is a 20 minute segment of the noisy data of FIG. 5, with a hand-drawn "best guess" of the actual snow weight.

The most obvious solution to this problem is to have the computer apply an analytical process similar to the human reasoning used to construct the "best guess" line in FIG. 7. To do this, the computer has to be instructed to find the sections of the raw-data curve where wind effects were minimal or not present. A straight-line connection of these quiescent periods should then approximate the hand-drawn line.

The successful implementation of this technique depends entirely upon the computer determination of quiescent periods (QPs); therefore, two critical elements of a QP must be defined before this type of analysis is conducted. The first element is the minimum time duration or minimum number of data points that constitute a QP, and the second is the magnitude of the natural variation that could be experienced in a situation without noise. Both are characteristics of the raw data. Thus, different types of measurements will require different definitions.

A close scrutiny of the raw snow-weight data shows that the extraneous values (wind effects) normally exhibit substantial changes in magnitude and polarity in adjacent weight readings. Two noisy readings with only small differences between them may occur infrequently, but three adjacent noisy points with approximately the same weight have not been found. Three adjacent weight values showing little or no change indicate that no extraneous readings are present. The minimum duration of a QP was therefore defined as three points over a 9-sec time period.

The electronic balance used in these measurements had a resolution of 0.01 g. During a 3-point period of no snow and little or no wind, three adjacent readings would have three identical weights or two of the same with the third showing ±0.01 g. Therefore, the natural variation of the data allows weight differences of at least ±0.01 within a QP. This magnitude difference is referred to as a weight limit.

Establishing these criteria enables the computer to begin analyzing the data. The first programmed instruction is to step through the raw data and search for a QP. This is done by veraging the weight (W) at a particular data point number (N) with the preceding weight at N−1 and the following N+1 as $$W = \frac{W_{N-1} + W_N + W_{N+1}}{3} g. \qquad (1)$$

The mean weight (W) is then compared to each of the three constituent weithts. If any of the three is found to be more than the designated weight limit from the value of W, the point is rejected and the computer steps ahead by one point in the raw data and repeats the process. When all three readings are within the weight limit from W, a QP has been found.

At this time, the computer must determine whether this period is, in fact, the next valid sequential quiet region or if there should be one or more QPs defined by a larger weight limit between the QP just defined and the last previously found QP. This judgment is necessary so that the weight limit may be adjusted to account for increases (or decreases) in the base-line data. For example, if the base data are changing in increments of 0.01 g between points, a magnitude limit of 0.01 g will detect a QP. However, if the incremental change were 0.05 g, then a 0.05 g limit would be required. The judgment procedure will also serve to adjust the weight limit to account for changes that may occur in the natural variation.

The weight difference between a particular QP and the preceding one determines if a limit adjustment is required. If this differential weight is larger than the magnitude limit, there is a strong possibility that the base data, at some period or periods in the intervening region, are increasing in steps larger than the designated limit. If the weight differential is within the magnitude limit, that possibility does not exist. Therefore, when a quiet period has been found using a particular weight limit, the computer determines the weight difference between that period and the preceding one. If the difference is within the designated limit range, the period is considered valid. If not, the limit is increased by 0.01 g and the search for a QP is begun anew. This iteration is repeated until the weight difference between quiescent regions is within the magnitude limit used to define the second QP.

Upon determining the weight of a valid quiet period ($W_Q$) at some data point number ($N_Q$), the computer is then instructed to construct a straight-line approximation from the preceding quiet period $W_{Q-1}$ at point number $N_{Q-1}$. This operation assigns an interpolated value to each discarded reading between the adjacent QPs and essentially reconstruct the data curve minus the noisy points.

The first step in this process is the determination of the incremental weight difference ($\Delta w$) that is to be applied between data points by $$\Delta W = \frac{W_Q - W_{Q-1}}{N_Q - N_{Q-1}} g. \quad (2)$$

The individual intervening points are then assigned a weight $W_N$ as:

$$W_N = W_{Q-1} + \Delta W(N - N_{Q-1}) \quad (3)$$

(In this description, the weight readings are associated with data point numbers since the 3-sec time increments between readings may possibly cause confusion if the weights were based on a time reference.)

Figure 10:
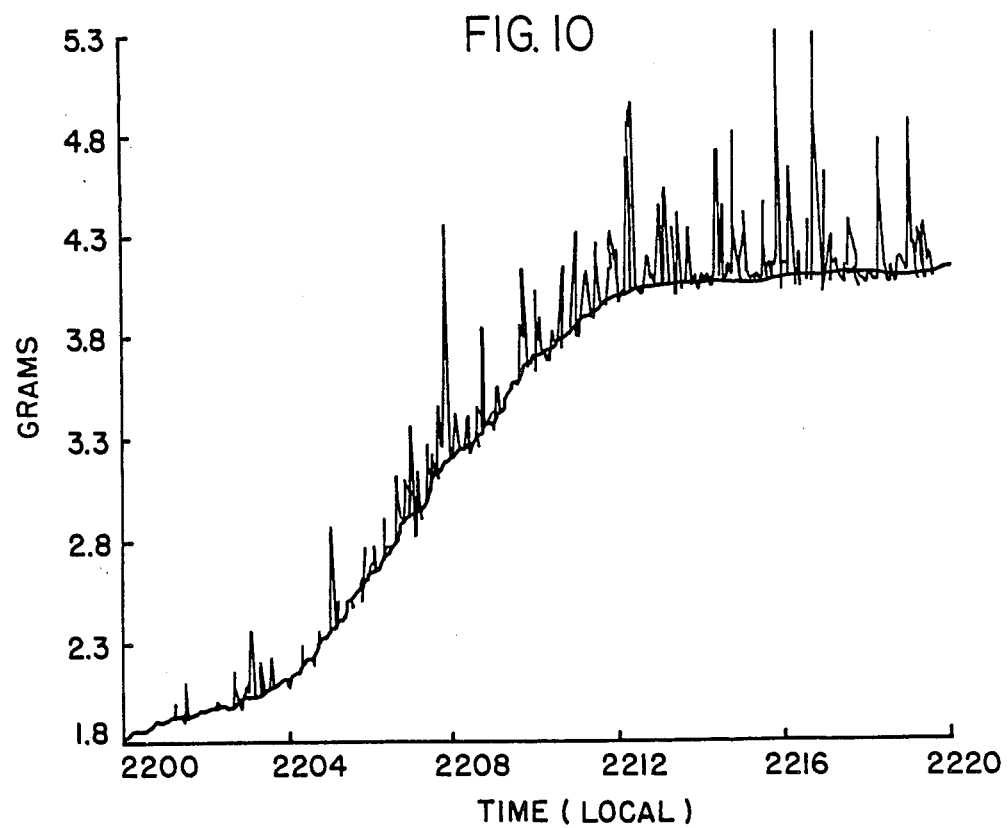
FIG. 10 is a 20-minute segment of the noisy data from FIG. 5 with a computer generated estimate of the actual snow weights using the present invention.

When the raw data from the 2200 to 2220 time period were subjected to the above analysis, a computer-generated approximation of the true data curve was constructed as shown by the superimposed line in FIG. 10. The differences between this line and the "best guess" line of FIG. 7 are minor and few. One can only speculate as to which approximation is more exact. The hand-drawn line tends to be smoother as some slight dips and rises can be detected in the computer version.

Figure 11:
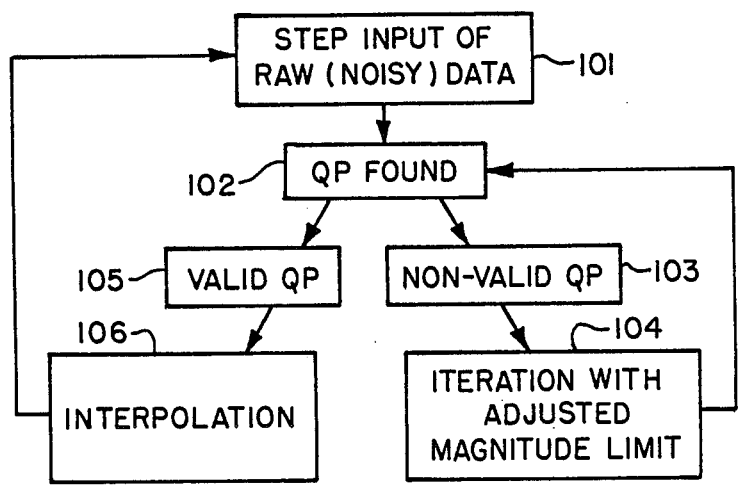
FIG. 11 is a flow diagram of the process of the present invention.

FIG. 11 is a flow diagram of the process of the present invention as expressed in its broadest possible steps. The process begins with the accumulation and input of noise-contaminated data into a data processor 101. Next, the quiescent periods (QP) are identified in the data 102 in the manner described above. As discussed above, this entails the substeps that include averaging increments of the adjacent data readings to produce an averaged data reading; and identifying the increment as a quiescent period if each of the individual data readings do not vary from the average by a selected magnitude limit.

Following this, a determination is made as to whether or not quiescent periods have been identified in the data base. If no quiescent periods have been identified 103, the magnitude limit is increased by an iteration 104, and the data is reevaluated 102 to identify quiescent periods in the data stream. Once valid quiescent periods are identified 105, an interpolation is performed 106 to assign estimates of the noise-free values of the data over the entire data base in the manner described above.

The process discussed above and described in the flow diagram of FIG. 11 was purposely designed to eliminate wind-induced extraneous readings from weight measurements used in the determination of snow rates. It must be emphasized that the application of this procedure to other type measurements imposes two requirements on the raw data. First, the data must be recorded or stored since iteration may be necessary, and second, the data must periodically approximate the base-line readings or, in other words, must have quiet or minimal noise periods.

In addition, it may be advantageous to designate a particular point limit in the search for QPs. In most cases, the QP validity check, where the differences in QP values are required to conform to the magnitude limit, will act to restrict the number of points in the search for a QP because of changing base-line data. However, in certain situations of heavy noise and a slowly changing base line, a data set may conceivably be described by one straight-line extrapolation over a large number of points. This circumstance is alleviated by designating a maximum time duration or maximum number of points in the search for a QP. This designation is referred to as a "search limit."

Upon reaching the number of points in the search limit, it is assumed that any and all intervening quiet periods have larger deviations that that of the current magnitude limit. This limit is then increased and the search restarted.

Snow weight data generally show quiet regions occurring periodically in 1 to 4 min intervals. A 5-min or 100-point search limit was included in the snow rate analysis program and in the noise elimination process used to produce the computer generated approximation in FIG. 10. However, the limit was not required in this 20-min segment as the maximum search period encompassed 85 points (4.25 min).

Figure 12:
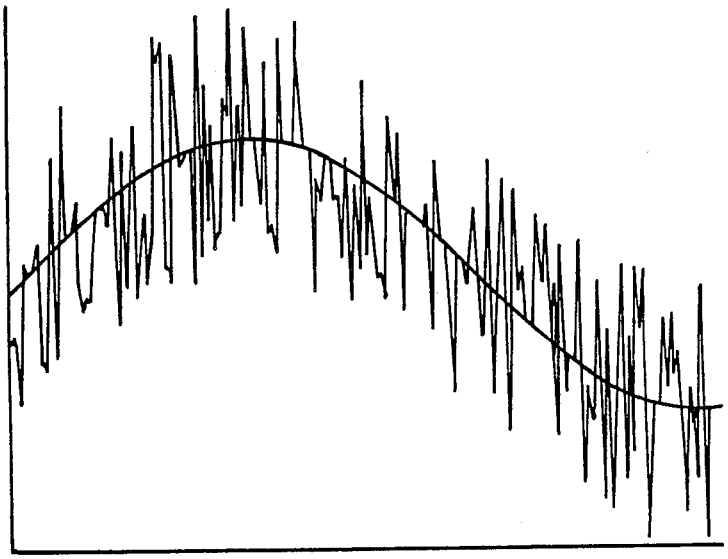
FIG. 12 is a base-line curve superimposed on assumed, computer generated noisy data that varied randomly in both magnitude and polarity.
Figure 13:
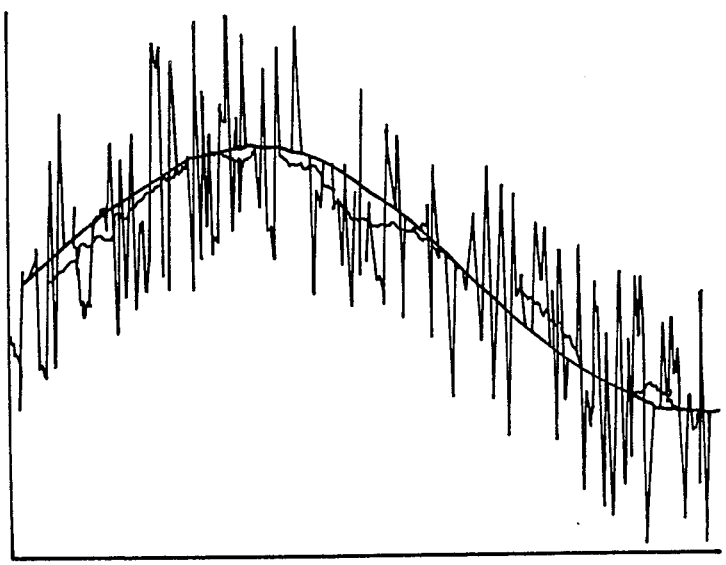
FIG. 13 is the assumed noisy data of FIG. 12 with the computer apporoximation using the process of the present invention.

The noise elimination process has been successfully applied to measurements other than snow weights although that data are of proprietary nature and can not be reproduced here. has also proved successful in tests using computer-generated assumed data. For example, FIG. 12 shows 200 points of base-line data in the form of a partial sine wave with superimposed assumed noisy "raw data." The extraneous readings are random in both magnitude and polarity. Also, the QPs were randomly dispersed at intervals of 30 points, thus imposing a 30-point search limit. The computer approximation of the base data is shown in FIG. 13 along with a 20-point running-mean average of the assumed raw data.

The procedure described above is straightforward in logic and application. Because of this, it may prove useful in the analysis of other types of measurements. The entire process requires a computer routine as demonstrated by the 27-line basic program in Table 1. This program was used to determine the values of the computer-generated approximation shown plotted in FIG. 10.

TABLE 1

| | |
|---|---|
| D (n) | Data (raw) array |
| X (n) | Point number array for plotting |
| Y (n) = | Weight array for plotting |
| A = | Average of 3 points |
| L = | Magnitude limit |
| N = | Number of plotting points |
| P = | Point number at start of QP search |
| W = | Weight at preceding QP |
| W1 = | Delta weight between adjacent QPs |
| 100 | N = 1 |
| 110 | P = 1 |
| 120 | L = .01 |
| | (Iteration) |
| 130 | For I = P + 1 to 399 |
| 140 | A = (D (I − 1) + D (I) + D (I + 1))/3 (Eq 1) |
| 150 | For J = I − 1 to I + 1 |
| 160 | If A − D (J) > L then 350 (check search limit) |
| 170 | If D (J) − A > L then 350 (check search limit) |
| 180 | Next J |
| | (QP found) |
| 190 | If N > 1 then 230 (validity check) |
| | (initial plotting point) |
| 200 | X (N) = I |
| 210 | Y (N) = A |
| 220 | Goto 320 (continue sampling) |
| | (Validity check) |
| 230 | If A − W < = then 260 (valid QP) |
| | (Increasing magnitude limit) |
| 240 | L = L + 01 |
| 250 | Goto 130 (iteration) |
| | (Valid QP) |
| 260 | W1 = (A − W)/(I − P) (Eq. 2) |
| | (Interpolation) |
| 270 | For J = P + 1 to I |
| 280 | N = N + 1 |
| 290 | X (N) = J |
| 300 | Y (N) = W + W1* (J − P) (Eq. 3) |
| 310 | Next J |
| | (Continue sampling) |
| 320 | P = I |
| 330 | W = A |
| 340 | L = .01 |
| | (Search limit) |
| 350 | If I − P > 100 then 240 (increase magnitude limit) |
| 360 | Next I. |

The program listed above in Table 1 is the basic program of the noise elimination procedure used to plot the computer approximation obtained for FIG. 10. This approximation was obtained in the manner described below.

Figure 14:
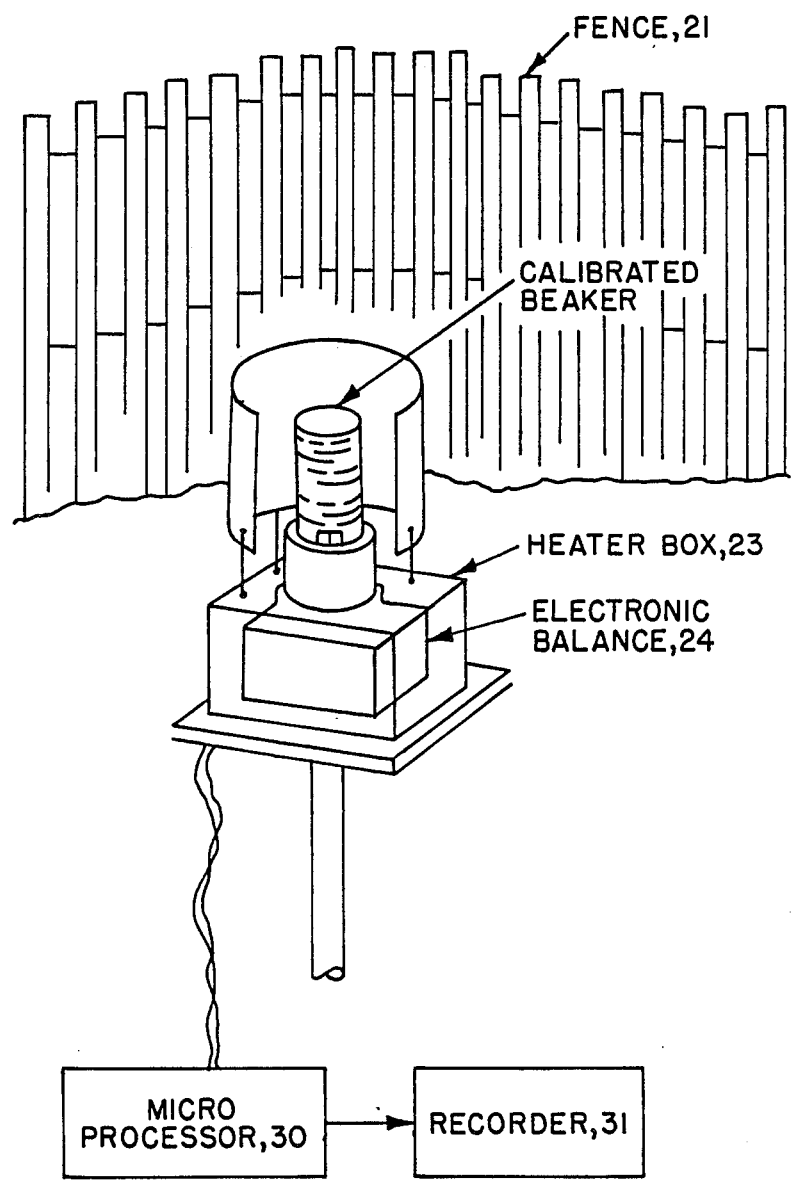
FIG. 14 is an illustration of a snow measuring system which is imposed by the present invention.

FIG. 14 is an illustration of a snow rate measuring system which is improved by the present invention. This system entails the use of a snow rate meter which uses an electronic balance 24 to help determine the snow rate from weight readings which are taken over intervals of time. The elements of this snow rate system were described in an article by L. Gibbons, A. Matthews, R. Berthel and V. Plank entitled "Snow Characterization Instruments" which was published in an Air Force Geophysics Laboratory report AFGL-TR-83-0063 in 1983. However, this early version of the snow rate meter was subject to wind-induced extraneous noise, which contaminated the data, as depicted in FIG. 5, with data spikes. The effects of the wind are reduced, but not eliminated by the use of the protection fence 21.

The heart of the snow rate meter is an electronic balance 24 that has remote operating capabilities and gives weight determinations of 0.01 g resolution at time intervals approaching 3 sec. A compatible microprocessor 30 takes the balance output signal and formats it for recording on magnetic tape 31.

The balance 24 is enclosed in a sheet-metal, styrofoam-insulated box 23 that is electrically heated and thermostatically controlled to maintain the proper operating temperature for the balance. The original shaft purchased with the balance, which connects the sensing head to the weighting pan, was extended to protrude above the heated box so that the snow sample container would be isolated from the possible effects of escaping heat. The sample container itself is cylindrical in shape with a bottom contoured so that it can be centered on the weighing pan. It is made of clear plastic, is 15.1 cm in diameter with a 3 liter capacity, and is inscribed with 200 ml calibration marks to allow volumetric measurements of the snow. Using the volumetric and weight measurements one can compute snow density. Due to the precision of the balance, it was found to be inherently sensitive to wind effects and the problem was addressed by a series of three baffling devices. The first, a 1.3 m high snow fence 21, was mounted 1 m off the ground is a 5 m (diameter) circle to disrupt the more severe horizontal wind components. Second, a vertically adjustable sheet-metal shield, 30.5 cm in diameter is attached to the top of the heater box 23. Its height is adjusted to limit collection of only those snow crystals having trajectories within 45° of the vertical. The shield is constructed in halves that are hinged to allow access to the sample container. Third, the sample container, weighing pan, and balance connecting shaft are enclosed by a 17.8 cm clear plastic tube to further reduce wind effects, as well as to keep snow from accumulating on the moving parts of the balance. A thin copper updraft baffle and a tapered sampling lip are attached at the top of the tube to ensure that snow entering the sample area would be directed into the container and not allowed to accumulate between the container tube. Table 2 describes some of the Snow Rate Meter's components.

TABLE 2

| Snow Rate Meter Components | |
|---|---|
| Item | Source |
| Electrical Balance | Scientech Model 3340 with remote scale |
| Calibrated Beaker | 3 liter with 200 ml graduations |
| Heater Box | Constructed in-house |
| Inner and Outer Wind Shielding | Constructed in-house |
| Data Collection | Tektronix Model 4923 Digital Recorder |

Although the snow rate meter surpassed expectations in providing accurate data, it initially suffered from severe data oscillations or "noise" due to wind effects. The use of the array of baffles has reduced these effects to a more acceptable level, but noise remained a problem. However, when the microprocessor 30 is programmed with the algorithm of Table 1, the snow rate system of FIG. 14 is improved in a number of ways. As described above, the output of the microprocessor includes a series of interpolated values for the sensed data, which represents the data base which is relatively uncontaminated by noise. When the recorder 31 of FIG. 14 is a conventional plotter, the output of the plotter can be as depicted in FIG. 10, rather than the plot of FIG. 6. As mentioned above, the plot of FIG. 6 was an example, of the actual data, which was contaminated by noise spikes. The computer-generated approximation of FIG. 10 includes the estimates of the actual snow weights superimposed on the noise-contaminated actual data.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An improved snow rate measuring system which determines a set of ideal values which represent a rate of snowfall, said improved snow rate measuring system comprising:
   a means for collecting falling snow;
   an electric balance which receives and weighs said falling snow from said collecting means to produce a series of measurement signals in an actual data stream which indicates the rate of snowfall, said measurement signal being subject to wind-induced noise in said actual data stream;
   a means for displaying said plot of ideal values along with said actual data stream; and
   an electronic digital signal processor which receives said actual data stream from said electronic balance and which produces an output to said displaying means which includes said ideal value as well as said actual data stream, said electronic digital signal processor comprising a general purpose data processor which is programmed with an approximation routine which comprises:

| | |
|---|---|
| $D(n) =$ | Data (raw) array |
| $X(n) =$ | Point number array for plotting |
| $Y(n) =$ | Weight array plotting |
| $A =$ | Average of 3 points |
| $L =$ | Magnitude limit |
| $N =$ | Number of plotting points |
| $P =$ | Point number at start of QP search |
| $W =$ | Weight at preceding QP |
| $W1 =$ | Delta weight between adjacent QPs |
| 100 | $N = 1$ |
| 110 | $P = 1$ |
| 120 | $L = 0.1$ |
| | (Iteration) |
| 130 | For $I = P + 1$ to 399 |
| 140 | $A = (D(I - 1) + D(I) + D(I + 1))/3$ (Eq 1) |
| 150 | For $J = I - 1$ to $I + 1$ |
| 160 | If $A - D(J) > L$ then 350 (check search limit) |
| 170 | If $D(J) - A > L$ then 350 (check search limit) |
| 180 | Next J |
| | (QP found) |
| 190 | If $N > 1$ then 230 (validity check) |
| | (initial plotting point) |
| 200 | $X(N) = I$ |
| 210 | $Y(N) = A$ |
| 220 | Go to 320 (continue sampling) |
| | (Validity check) |
| 230 | If $A - W$ L then 260 (valid QP) |
| | (Increasing magnitude limit) |
| 240 | $L = L[.] + .01$ |
| 250 | Go to 130 (iteration) |
| | (Valid QP) |
| 260 | $W1 = (A - W)/(I - P)$ (Eq. 2) |
| | (Interpolation) |
| 270 | For $J = P + 1$ to I |
| 280 | $N = N + 1$ |
| 290 | $X(N) = J$ |
| 300 | $Y(N) = W + W1*(J - P)$ (Eq. 3) |
| 310 | Next J |
| | (Continue sampling) |
| 320 | $P = I$ |
| 330 | $W = A$ |
| 340 | $L = .01$ |
| | (Search limit) |
| 350 | If $I - P > 100$ then 240 (increase magnitude limit) |
| 360 | Next I. |

* * * * *